(12) United States Patent
Van der Velden

(10) Patent No.: US 9,671,943 B2
(45) Date of Patent: Jun. 6, 2017

(54) TOUCH-ENABLED COMPLEX DATA ENTRY

(71) Applicant: Dassault Systemes Simulia Corp., Providence, RI (US)

(72) Inventor: Alexander Jacobus Maria Van der Velden, Atlanta, GA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 194 days.

(21) Appl. No.: 13/631,745

(22) Filed: Sep. 28, 2012

(65) Prior Publication Data

US 2014/0092030 A1   Apr. 3, 2014

(51) Int. Cl.
*G06F 3/0484* (2013.01)
*G06F 3/0488* (2013.01)

(52) U.S. Cl.
CPC ........ *G06F 3/04847* (2013.01); *G06F 3/0488* (2013.01)

(58) Field of Classification Search
CPC .............. G06F 3/04847; G06F 3/0482; G06F 3/04842; G06F 3/044; G06F 3/04883; G06F 3/048; G06F 3/0488
USPC .................................................. 345/156, 173
See application file for complete search history.

(56) References Cited

U.S. PATENT DOCUMENTS

| | | | | |
|---|---|---|---|---|
| 5,485,600 A | * | 1/1996 | Joseph | G06F 8/34 345/473 |
| 5,559,301 A | * | 9/1996 | Bryan et al. | 84/653 |
| 5,908,997 A | * | 6/1999 | Arnold et al. | 84/615 |
| 6,160,213 A | * | 12/2000 | Arnold et al. | 84/615 |
| 6,486,896 B1 | * | 11/2002 | Ubillos | G06F 3/04855 715/781 |
| 6,512,530 B1 | * | 1/2003 | Rzepkowski et al. | 715/833 |
| 6,614,456 B1 | * | 9/2003 | Rzepkowski et al. | 715/833 |
| 6,704,032 B1 | * | 3/2004 | Falcon | G06F 3/0481 715/746 |
| 7,339,580 B2 | | 3/2008 | Westerman et al. | |
| 7,605,804 B2 | | 10/2009 | Wilson | |
| 7,656,394 B2 | | 2/2010 | Westerman et al. | |
| 7,719,523 B2 | | 5/2010 | Hillis | |
| 7,840,912 B2 | | 11/2010 | Elias et al. | |
| 7,856,605 B2 | | 12/2010 | Ording et al. | |
| 8,049,730 B2 | | 11/2011 | Joguet et al. | |
| 8,875,054 B2 | * | 10/2014 | Hopkins et al. | 715/833 |
| 2001/0024196 A1 | | 9/2001 | Nishizawa | |
| 2004/0046735 A1 | * | 3/2004 | Gombert | G06F 3/0338 345/156 |

(Continued)

FOREIGN PATENT DOCUMENTS

EP    1731984 A1    12/2006

OTHER PUBLICATIONS

European Search Report dated Jan. 10, 2014 for European Application No. EP 13183881.

*Primary Examiner* — Michael J Jansen, III
(74) *Attorney, Agent, or Firm* — Hamilton, Brook, Smith & Reynolds, P.C.

(57) ABSTRACT

A computer-implemented method for touch input via a multi-touch surface includes displaying an input widget via the multi-touch surface, wherein the input widget includes at least one control field and at least one element bar. A finger contact is detected along the multi-touch surface and substantially within the control field or the element bar. In response to detecting the finger contact, the contents of the element bar are adjusted.

24 Claims, 8 Drawing Sheets

(56) References Cited

U.S. PATENT DOCUMENTS

| | | | |
|---|---|---|---|
| 2004/0135826 A1* | 7/2004 | Pickering | 345/860 |
| 2006/0015821 A1* | 1/2006 | Jacques Parker | G06F 3/0481 715/800 |
| 2006/0022956 A1* | 2/2006 | Lengeling et al. | 345/173 |
| 2006/0026521 A1 | 2/2006 | Hotelling et al. | |
| 2006/0256090 A1* | 11/2006 | Huppi | A63F 13/02 345/173 |
| 2007/0211023 A1* | 9/2007 | Boillot | 345/156 |
| 2008/0122799 A1* | 5/2008 | Pryor | G06F 3/0312 345/173 |
| 2008/0141181 A1* | 6/2008 | Ishigaki | G06F 3/011 715/863 |
| 2008/0165149 A1* | 7/2008 | Platzer | G04G 11/00 345/173 |
| 2008/0168403 A1* | 7/2008 | Westerman | G06F 3/04883 715/863 |
| 2008/0222560 A1* | 9/2008 | Harrison | G06F 3/04847 715/800 |
| 2009/0276731 A1* | 11/2009 | Yamakawa | 715/833 |
| 2010/0011307 A1 | 1/2010 | Desfossez et al. | |
| 2010/0177049 A1 | 7/2010 | Levy et al. | |
| 2010/0194677 A1* | 8/2010 | Fiebrink | G06F 3/04847 345/156 |
| 2010/0251148 A1* | 9/2010 | Brown | F41G 3/32 715/764 |
| 2011/0050594 A1* | 3/2011 | Kim | G06F 3/04847 345/173 |
| 2011/0074707 A1* | 3/2011 | Watanabe et al. | 345/173 |
| 2011/0080351 A1* | 4/2011 | Wikkerink et al. | 345/173 |
| 2011/0157025 A1 | 6/2011 | Hoover et al. | |
| 2011/0179388 A1 | 7/2011 | Fleizach et al. | |
| 2011/0246943 A1* | 10/2011 | Fujibayashi | G06F 3/0488 715/833 |
| 2012/0013548 A1 | 1/2012 | Choi et al. | |
| 2012/0030626 A1* | 2/2012 | Hopkins et al. | 715/833 |
| 2012/0110427 A1* | 5/2012 | Krause | G06F 17/30899 715/208 |
| 2012/0110517 A1* | 5/2012 | Sparks | G06F 3/0482 715/863 |
| 2013/0014057 A1* | 1/2013 | Reinpoldt | G06F 3/04847 715/833 |
| 2013/0201098 A1* | 8/2013 | Schilit | H04L 12/282 345/156 |

* cited by examiner

TOUCH-ENABLED COMPLEX DATA ENTRY

BACKGROUND OF THE INVENTION

The embodiments described herein relate generally to touch input into a computer device and, more particularly, to inputting complex data using touch-sensitive devices.

Computing devices with touch screens are becoming more common in the business world. For example, such devices are currently used in fields such as gaming, engineering systems, business intelligence, geology, science, and many others. These devices generally use touch input to receive user instructions. One example of known touch input methods is a widget that enables a user to select options and/or tune parameters. A widget may include sliders that enable a user to slide a marker to a desired point between a maximum and a minimum. A widget may also include checkboxes, radio buttons, and/or toggle buttons. Furthermore, a widget may include simple text boxes that enable a user to type via a virtual keyboard or an attached physical keyboard. Another example of known touch input tools include simple play, pause, and play control buttons. These are well known in the industry and have been applied to many different media types, including music, movies, and podcasts. Known touch input methods also include drop-down boxes, nested dropdown boxes, and spinning drop-down boxes that appear as slot machine wheels, for example.

Known touch input methods, however, are useful for only simple, one-dimensional datasets, such as control of playback of a single movie where the only tunable dimension is time. Science and engineering fields, on the other hand, often use complex datasets where functionality is grouped for ease of use. Examples of such datasets include arrays having multiple elements; pressure statistics including mean and standard deviation values; gas states including pressure, density, and temperature values; object dynamic states include position (x, y, z), velocity ($\dot{x}$, $\dot{y}$, $\dot{z}$), and acceleration ($\ddot{x}$, $\ddot{y}$, $\ddot{z}$) vectors; objective definitions including minimum, maximum, and target values; and ontology such as driveline, gearbox, and gearwheel values. Known touch input methods do not easily enable existing paradigms of complex sliders and/or data tree structures to, for example, mobile applications or devices because input based on finger contact is not as precise as mouse clicks. Moreover, known touch input methods often hide data such that it cannot easily be monitored during operation.

BRIEF DESCRIPTION OF THE INVENTION

In one aspect, a computer-implemented method for touch input via a multi-touch surface includes displaying an input widget via the multi-touch surface, wherein the input widget includes at least one control field and at least one element bar. A finger contact is detected along the multi-touch surface and substantially within the control field or the element bar. In response to detecting the finger contact, the contents of the element bar are adjusted.

In another aspect, a computer device includes a multi-touch surface configured to receive user input via touch and to display information based on the user input, and a processor operatively coupled to the multi-touch surface. The processor is configured to cause the multi-touch surface to display an input widget that includes at least one control field and at least one element bar, detect a finger contact along the multi-touch surface and substantially within the control field or the element bar, and, in response to detecting the finger contact, adjust the contents of the element bar and cause the multi-touch surface to display the adjusted contents.

In another aspect, a computer device includes a multi-touch surface configured to receive user input via touch and to display information based on the user input, and a processor operatively coupled to the multi-touch surface. The processor is configured to cause the multi-touch surface to display an input widget that includes at least one control field, a label bar, and a value bar. The processor detects a first finger contact along the multi-touch surface and substantially within the control field and, in response to detecting the first finger contact, adjusts the label bar to select a desired element. The processor also detects a second finger contact along the multi-touch surface and substantially within the at least one control field and, in response to detecting the second finger contact, adjusts the value bar to select a desired value of the selected element.

DETAILED DESCRIPTION OF THE INVENTION

Exemplary embodiments of systems, methods, and devices for use in receiving and processing complex datasets via touch input are described herein. The embodiments described herein facilitate quickly and easily drilling down to a desired element using a single input widget that enables access to many elements. The embodiments described herein also facilitate interactively setting the desired value of an element. Known touch input methods require too-fine accuracy of contact points, resulting in "fat finger" errors, and/or enable values and settings to be entered for only a single associated element.

Exemplary technical effects of systems, methods, and devices described herein include at least one of: (a) displaying one or more input widgets via a multi-touch display, wherein the input widget includes, for example, first and second control fields, a label bar, and a value bar; (b) detecting a finger contact along the multi-touch surface substantially within one of the control fields, the label bar, or the value bar; (c) changing the element displayed in the input widget, including changing the label in the label bar and associated value in the value bar, if the finger contact is detected substantially within the label bar; (d) displaying a virtual keyboard, receiving a new value related to the currently displayed element and adjusting the value of the currently displayed element if the finger contact is detected substantially within the value bar; and (e) adjusting the value of the currently displayed element if the finger contact is detected substantially within one of the control fields.

Figure 1:
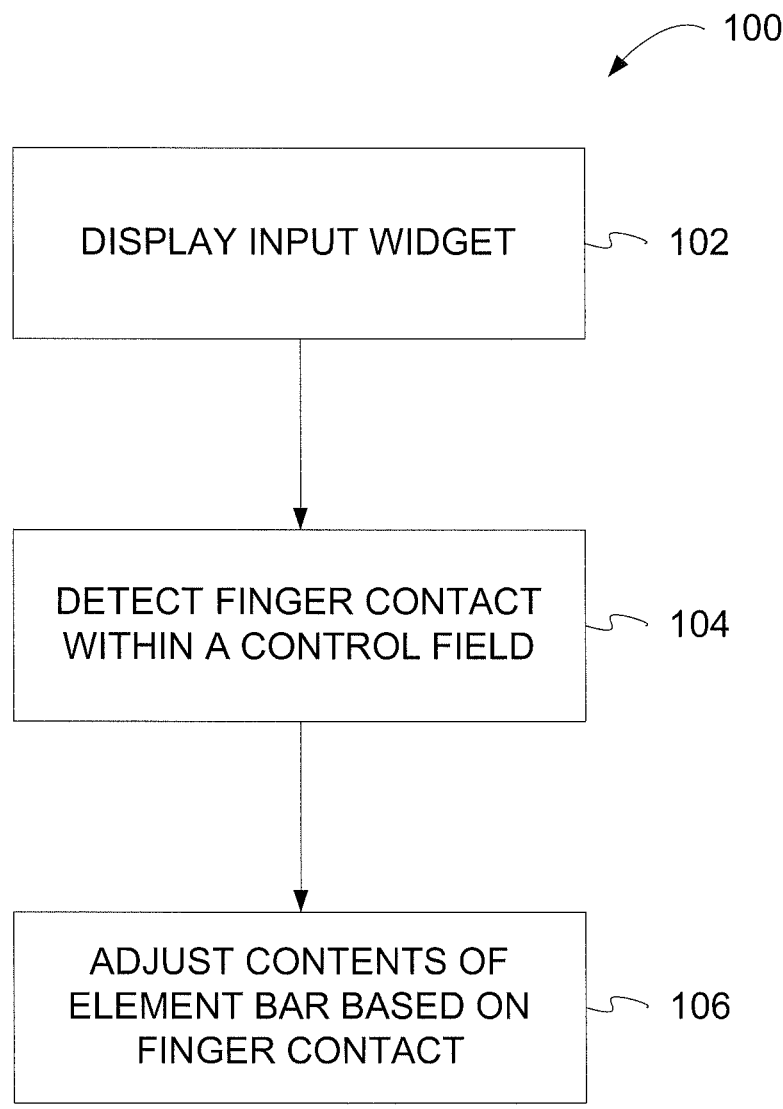
FIG. 1 is a flowchart that illustrates an exemplary computer-implemented method for touch input via a multi-touch surface.
Figure 2:
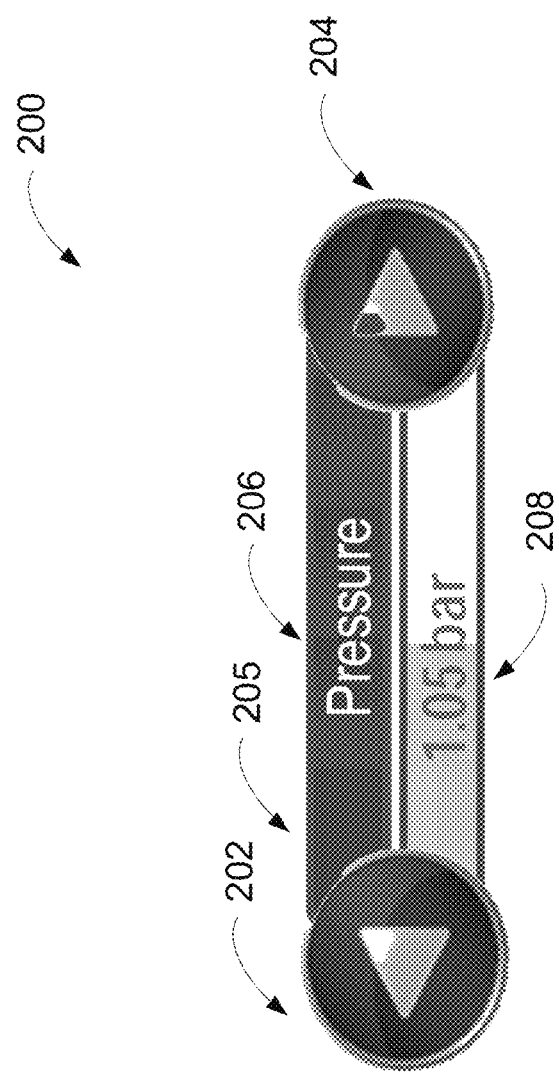
FIG. 2 is an illustration of an exemplary input widget for use in the method shown in FIG. 1.

FIG. 1 is a flowchart 100 that illustrates an exemplary computer-implemented method for touch input via a multi-touch surface of a computer device. In an exemplary embodiment, a multi-touch surface display displays 102 an input widget, or multiple input widgets, having at least one control field and at least one element bar. FIG. 2 is an illustration of an exemplary input widget 200. As shown in FIG. 2, the at least one control field includes a first control field 202 and a second control field 204. The at least one element bar 205 includes a label bar 206 and a value bar 208. The label bar 206 stores and/or displays a selected element label, such as pressure, density, fan speed, or any suitable element label for which a value can be assigned. The value bar 208 stores and/or displays a selected value for the element label shown in the label bar 206. The first and second control fields 202 and 204 can be used as described herein to adjust the element label and/or adjust the value.

Referring again to FIG. 1, the computer device detects 104 a finger contact along the multi-touch surface and substantially within one of the control field and the element bar. Moreover, in response to detecting the finger contact, the computer device adjusts 106 the contents of the element bar based on the context of the finger contact. As shown in FIG. 2, a user may touch or tap the first control field 202 to decrease the value in the value bar 208. Alternatively, the user may touch or tap the second control field 204 to increase the value in the value bar 208.

Figure 3:
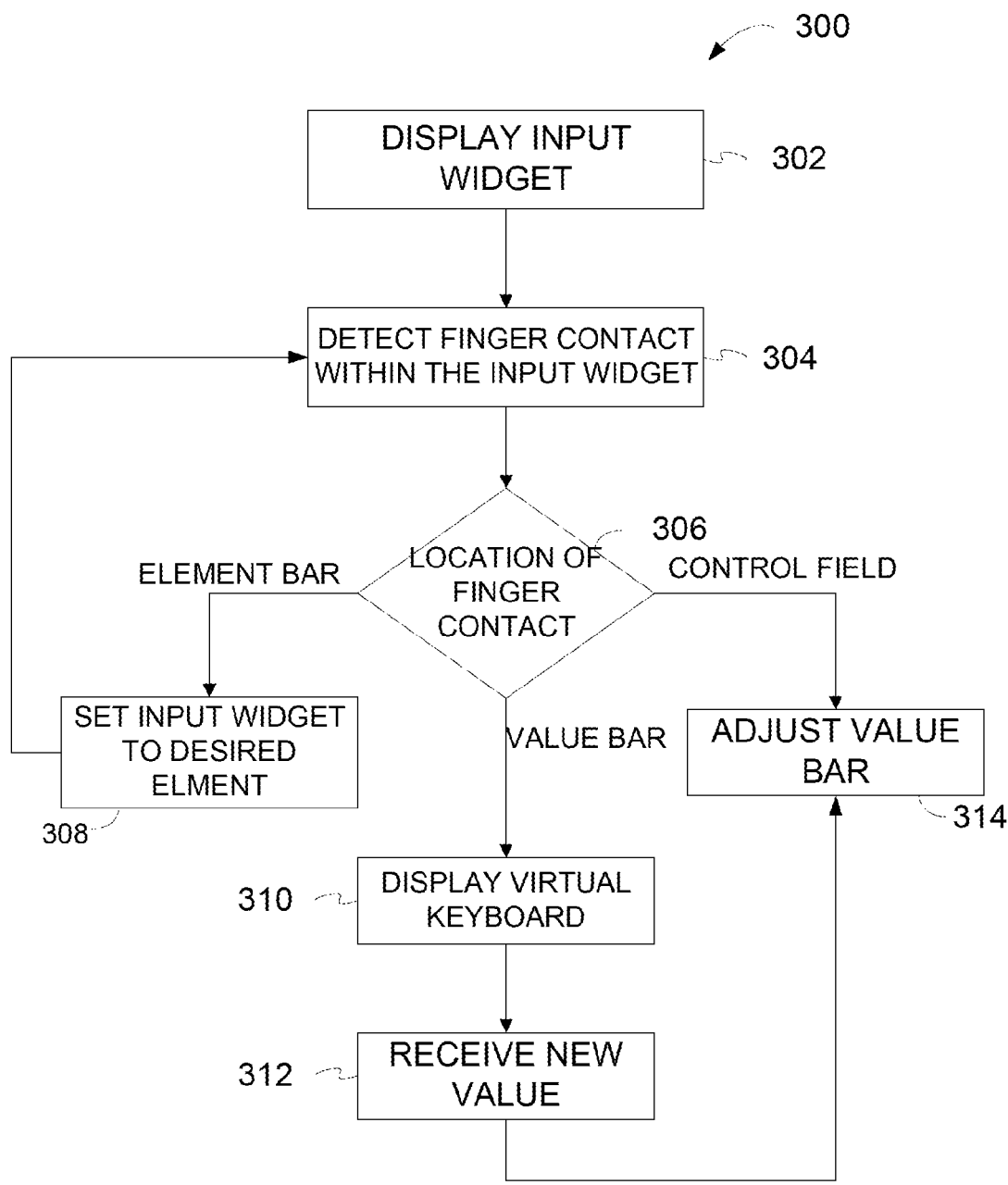
FIG. 3 is an expanded flowchart of the method shown in FIG. 1.
Figure 4:
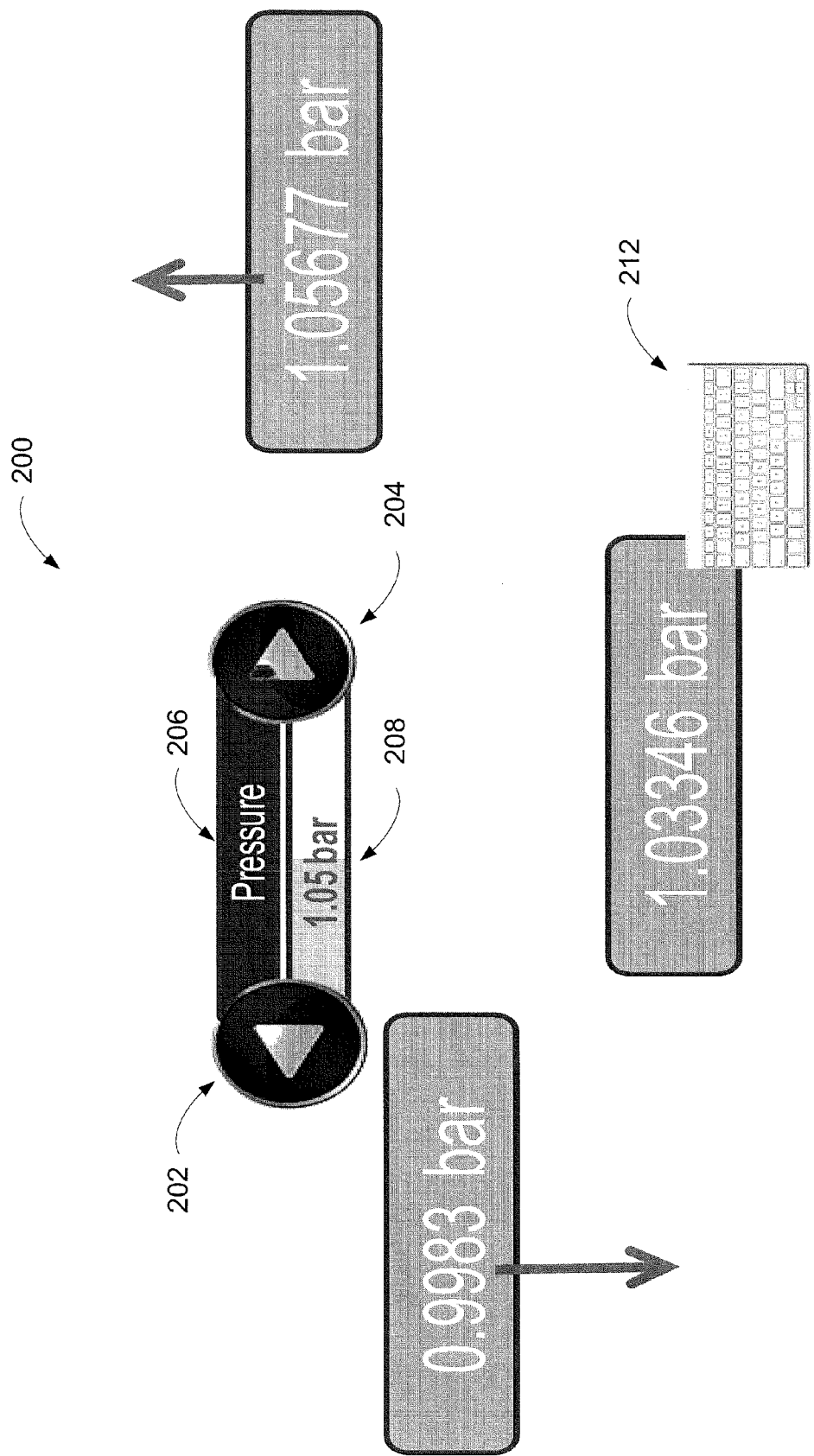
FIG. 4 is a second illustration of the input widget shown in FIG. 2.

FIG. 3 is an expanded flowchart 300 of the method shown in FIG. 1. In an exemplary embodiment, a multi-touch surface display displays 302 an input widget, or multiple input widgets, having at least one control field and at least one element bar. The position of the input widget will generally depend on the context in which the input widget is used. FIG. 4 is an illustration of input widget 200 having at least one control field and at least one element bar. As described above, the input widget 200 includes a first control field 202, a second control field 204, a label bar 206, and a value bar 208. Each control field 202 and 204 and bar 206 and 208 is touch input enabled.

Referring again to FIG. 3, the computer device detects 304 a finger contact along the multi-touch surface and substantially within one of the control field and the element bar. The computer device may detect 304 the finger contact using any suitable software and/or hardware technique that is known to one of skill in the art. Moreover, in response to detecting the finger contact, the computer device determines 306 the location of the finger contact along the multi-touch surface, again using any suitable software and/or hardware technique that is known to one of skill in the art. For example, the computer device may determine approximate coordinates of the detected finger contact along the multi-touch surface and compare the coordinates to known coordinates of the control field or element bar. If the computer device determines 306 that the finger contact was substantially within the element bar 206, the computer device sets 308 the label bar 206 of the input widget 200 to display a different element label and adjusts the value bar 208 to display a corresponding value of the new element label. In some embodiments, user can touch or tap the element bar 206 to lock and/or unlock the input widget 200. For example, in some embodiments, when the computer device detects a finger contact substantially within the label bar 206, a lock flag for the input widget 200 as a whole, or the value bar 208 specifically, is toggled. For example, if the value bar 208 is locked, the computer device unlocks the value bar 208 in response to detecting the finger contact.

Figure 5:
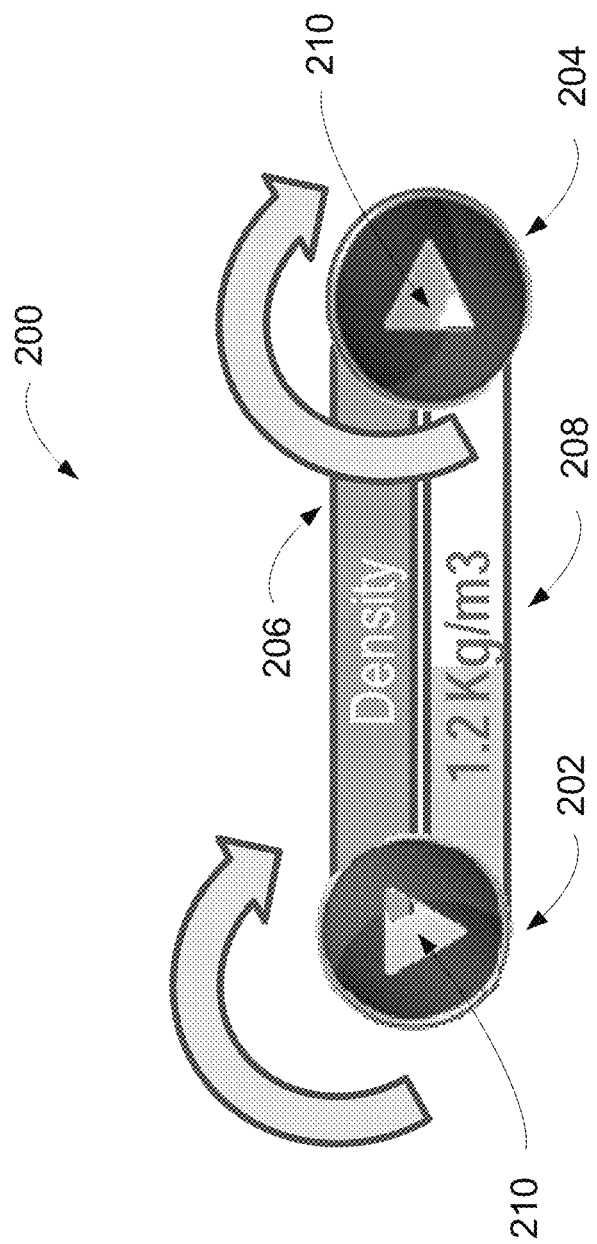
FIG. 5 is another illustration of the input widget shown in FIG. 2.

In some embodiments, the user can touch or tap the first control field 202 or the second control field 204, such as a long touch or a double tap, to change the element displayed in the input widget 200, wherein the label bar 206 is adjusted to display a different element label and the value bar 208 is adjusted 314 to display a corresponding value of the new element label. FIG. 5 is an illustration of such an embodiment. As shown in FIG. 5, an icon 210 is displayed within first and second control fields 202 and 204. When the computer device detects long touch (i.e., a touch that is timed longer than a predefined threshold time) or a double tap of the icon 210, for example, the multi-touch surface displays an animation or repositioning action of the touched or tapped icon 210. On example of an animation or repositioning action is rotation. In this example, the icon 210 rotates in a predefined direction, such as clockwise, from a first position to a second, different position. Where both control fields 202 and 204 include an icon 210, the number of possible elements that can be displayed using a single input widget 200 will depend on the number of positions enabled. For example, if each icon 210 can be positioned or oriented in each of the four cardinal directions, there will be a total of sixteen possible elements. If each icon 210 can be positioned or oriented in the four cardinal directions and the positions between, there will be a total of sixty-four possible elements.

Referring again to FIG. 3, and in an exemplary embodiment, and if the computer device determines 306 that the finger contact was substantially within the value bar 208, the computer device enables the user to enter a new value manually. For example, in some embodiments, when the computer device detects a finger contact substantially within the value bar 208, the multi-touch surface displays 310 a virtual keyboard 212. The computer device then receives 312 a desired value from the user via the virtual keyboard 212 and adjusts 314 the value bar 208 to display the desired value. The virtual keyboard 212 input may be detected and/or recorded using any suitable software and/or hardware technique that is known to one of skill in the art.

In an exemplary embodiment, and if the computer device determines 306 that the finger contact was substantially within a control field, the computer device adjusts 314 the value bar 208 based on the chosen control field. For example, a user can touch or tap the first control field 202 to decrease the value in the value bar 208. Similarly, the user can touch or tap the second control field 204 to increase the value in the value bar 208. In some embodiments, the user touches or taps the first control field 202 multiple times, such as four times, to minimize the value in the value bar 208. Similarly, in some embodiments, the user touches or taps the second control field 204 multiple times, such as four times, to maximize the value in the value bar 208. In some embodiments, the user may use gestures to minimize and/or maximize the value in the value bar 208. For example, the user may position a finger substantially over the first control field 202 and swipe down along the multi-touch surface in order to minimize the value. Similarly, the user may position a finger substantially over the second control field 204 and swipe up along the multi-touch surface in order to maximize the value.

Figure 6:
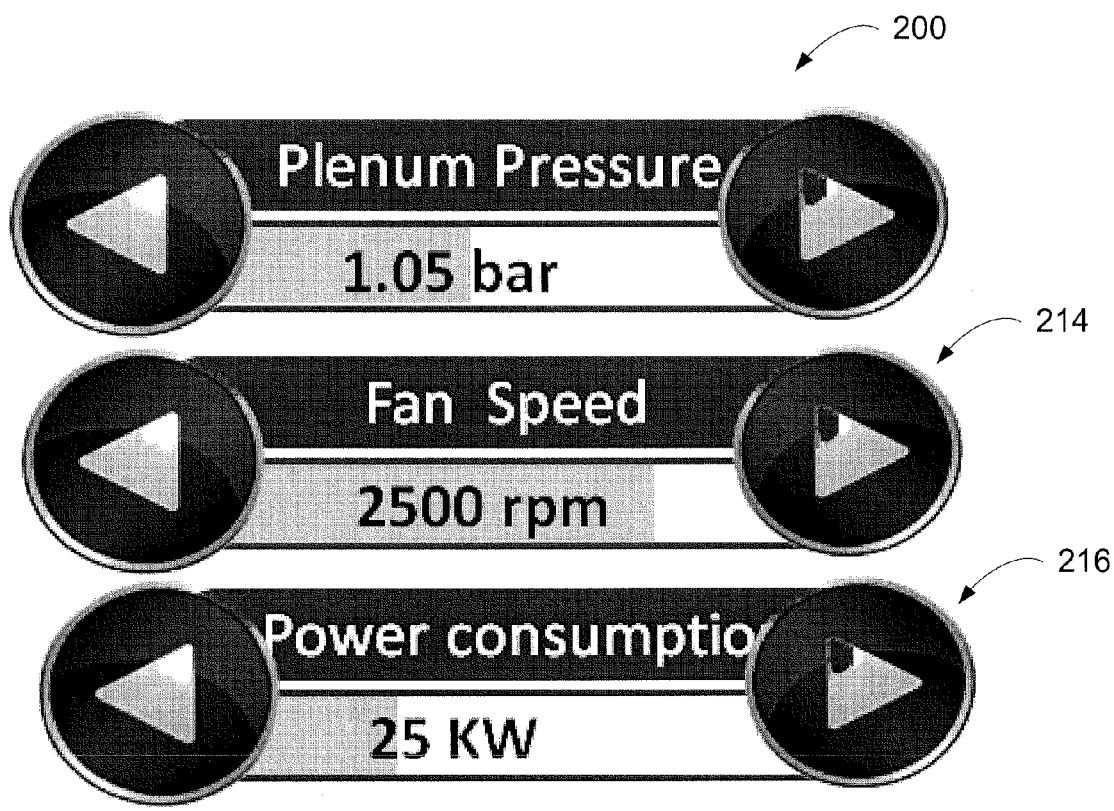
FIG. 6 is an illustration of a plurality of input widgets shown in FIG. 2.

In some embodiments, the input widget 200 includes multiple elements. For example, FIG. 6 is an illustration of a plurality of input widgets 200. Each input widget 200 may be separately controlled by user input as described above. Alternatively, a value for a label in a first input widget 214 may be, in part, based on a value for a label in a second input widget 216, such that changing the value of the second input widget 216 causes a corresponding change to the value of the first input widget 214.

Figure 7:
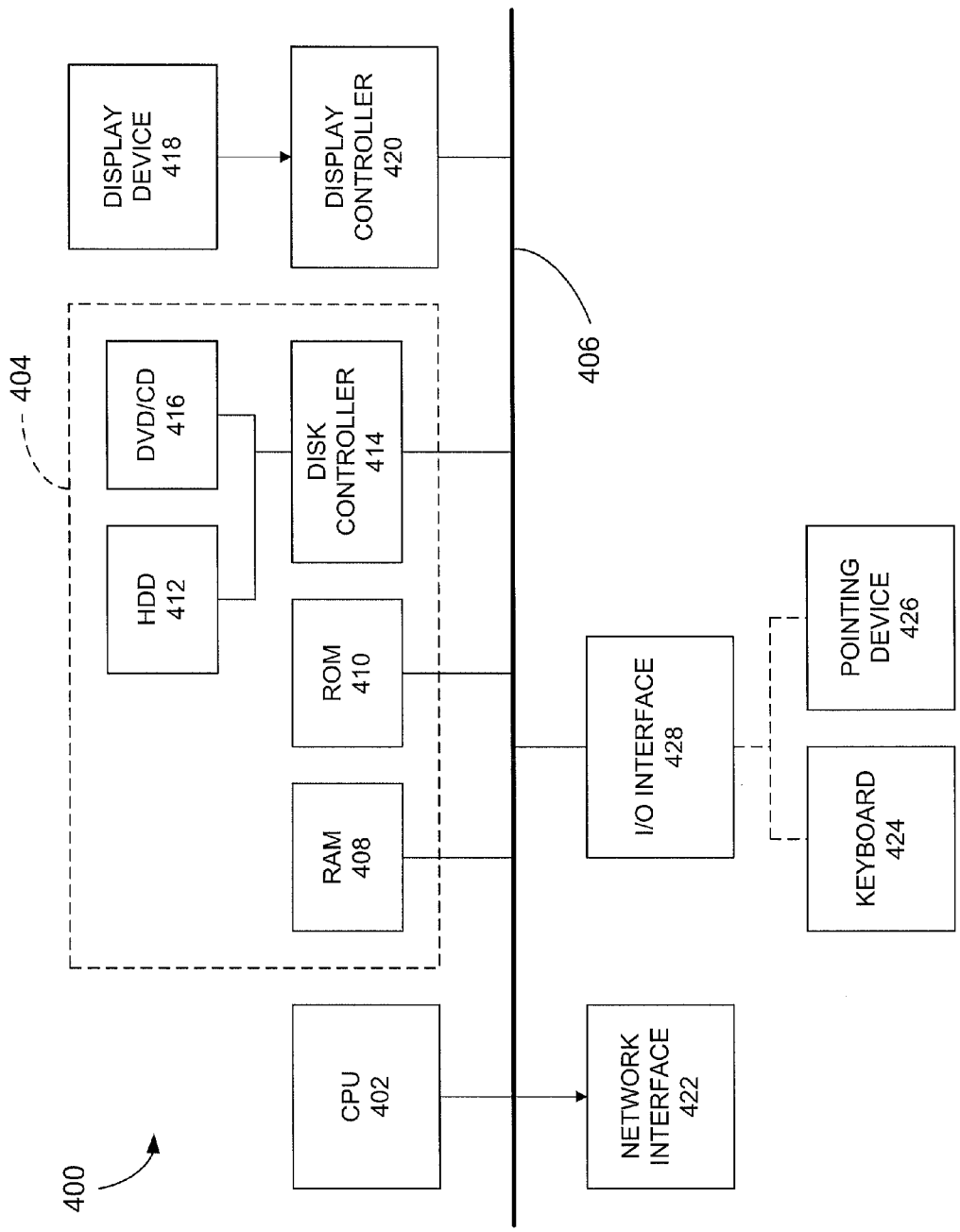
FIG. 7 is a schematic block diagram of an exemplary computer architecture for use for use in receiving complex data via touch input using a multi-touch surface.
Figure 8:
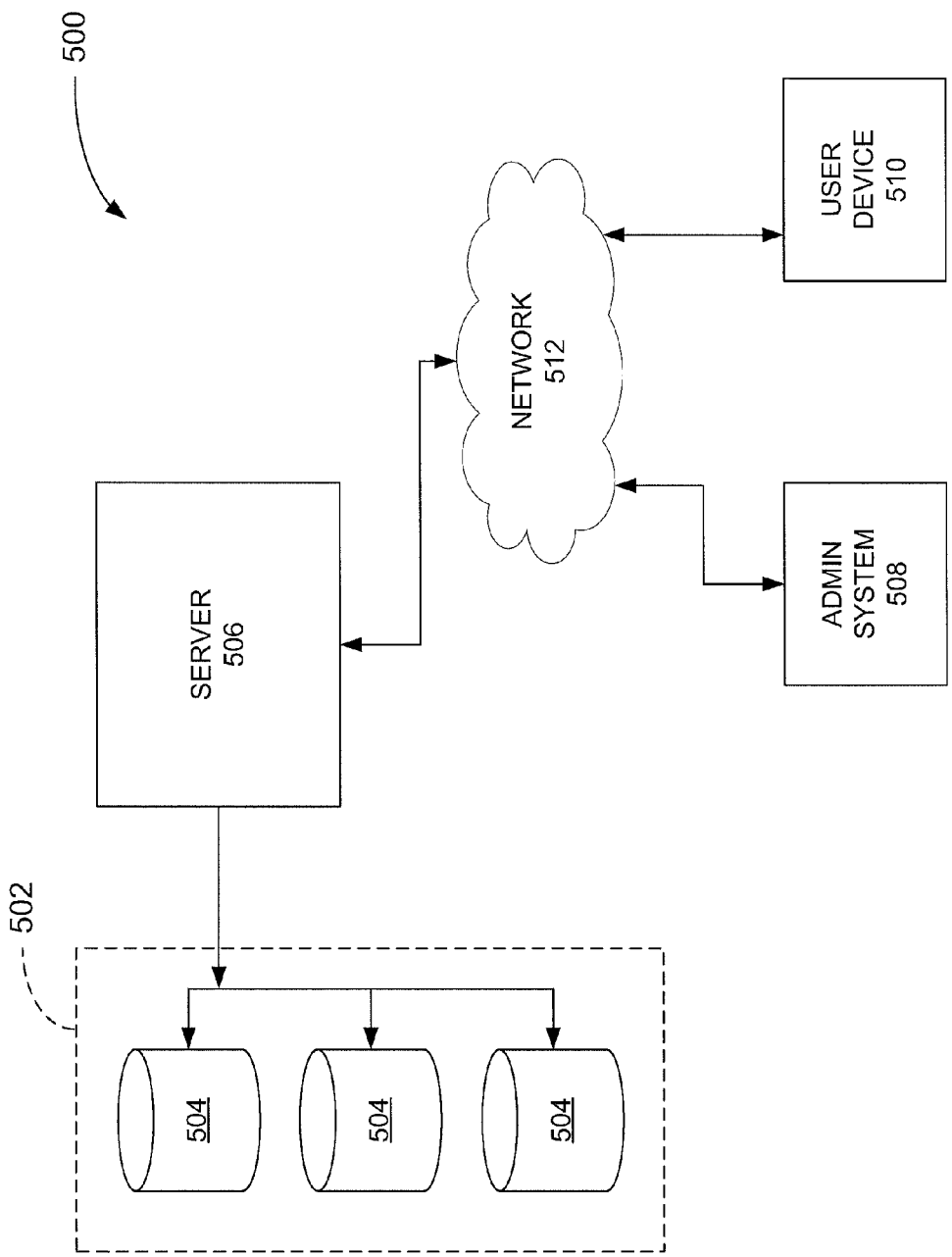
FIG. 8 is a schematic block diagram of an exemplary computer system for use in receiving complex data via touch input using a multi-touch surface.

FIG. 7 is a schematic block diagram of an exemplary computer architecture 400 for use with a computer device, such as user device 510 (shown in FIG. 8). In an exemplary embodiment, the computer architecture 400 includes one or more processors 402 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 404 that is operably and/or communicatively coupled to the processor 402 by a system bus 406. A "memory area," as used herein, refers generally to any means of storing program code and instructions executable by one or more processors to aid in receiving complex data via touch input using a multi-touch surface. The memory area 404 may include one, or more than one, forms of memory. For example, the memory area 404 may include random-access memory (RAM) 408, which can include non-volatile RAM, magnetic RAM, ferroelectric RAM, and/or other forms of RAM. The memory area 404 may also include read-only memory (ROM) 410 and/or flash memory and/or electrically-programmable read-only memory (EEPROM). Any other suitable magnetic, optical, and/or semiconductor memory, such as a hard-disk drive (HDD) 412, by itself or in combination with other forms of memory, may be included in the memory area 404. The HDD 412 may also be coupled to a disk controller 414 for use in transmitting and receiving messages to and from the processor 402. Moreover, the memory area 404 may also be, or may include, a detachable or removable memory 416, such as a suitable cartridge disk, CD-ROM, DVD, or USB memory. The above examples are exemplary only and, thus, are not intended to limit in any way the definition and/or meaning of the term "memory area."

The computer architecture 400 also includes a display device 418, such as a multi-touch display surface. The display device 418, or multi-touch surface, may be any suitable display and touch-sensitive device that enables the embodiments described herein. Exemplary multi-touch surfaces include capacitance sensing technologies such as surface capacitive technology, near field imaging technology, mutual capacitance technologies, and self-capacitance technology; resistive sensing systems such as analog or digital resistive technologies; optical technologies; wave technologies such as surface acoustic wave technology, dispersive signal touch technology, and acoustic pulse recognition technology; and/or force-sensing touch technology. Moreover, the display device 418 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism that enables touch-sensitive technology. The above examples are exemplary only and, thus, are not intended to limit in any way the definition and/or meaning of the term "display device." In an exemplary embodiment, the display device 418 is coupled, such as operatively coupled, to a display controller 420. The display controller 420 receives data via the system bus 406 for display by the display device 418. In an exemplary embodiment, the display controller 420 is a touch interface controller, or includes a touch interface controller.

In addition, the computer architecture 400 includes a network interface 422 for use in communicating with a network (not shown in FIG. 7). Moreover, the computer architecture 400 may include or be coupled to one or more input devices, such as a keyboard 424 and/or a pointing device 426, such as a roller ball, mouse, touchpad, and the like. The input devices may be coupled to and controlled by an input/output (I/O) interface 428, which is further coupled to the system bus 406.

A description of the general features and functionality of the keyboard 424, pointing device 426, as well as the disk controller 414, network interface 422, and I/O interface 428 is omitted herein for brevity as these features are known.

During operation, the processor 402 and/or the display controller 420 causes the multi-touch surface display 418 to display an input widget, such as input widget 200, having at least one control field and at least one element bar. The position of the input widget 200 will generally depend on the context in which the input widget is used. As described above, the input widget 200 includes a first control field 202, a second control field 204, a label bar 206, and a value bar 208. Each control field 202 and 204 and bar 206 and 208 is touch input enabled. The processor 402 and/or the display controller 420 detects a finger contact along the multi-touch surface 418 and substantially within one of the control field and the element bar. The processor 402 and/or the display controller 420 may detect the finger contact using any suitable software and/or hardware technique that is known to one of skill in the art. Moreover, in response to detecting the finger contact, the processor 402 and/or the display controller 420 determines the location of the finger contact along the multi-touch surface 418, again using any suitable software and/or hardware technique that is known to one of skill in the art. For example, the processor 402 and/or the display controller 420 may determine approximate coordinates of the detected finger contact along the multi-touch surface 418 and compare the coordinates to known coordinates of the control field or element bar. If the processor 402 and/or the display controller 420 determines that the finger contact was substantially within the element bar 206, the processor 402 and/or the display controller 420 sets the label bar 206 to display a different element label and adjusts the value bar 208 to display a corresponding value of the new element label. In some embodiments, user can touch or tap the element bar 206 to lock and/or unlock the input widget 200. For example, in some embodiments, when the processor 402 and/or the display controller 420 detects a finger contact substantially within the label bar 206, a lock flag for the input widget 200 as a whole, or the value bar 208 specifically, is toggled. For example, if the value bar 208 is locked, the processor 402 and/or the display controller 420 unlocks the value bar 208 in response to detecting the finger contact. In some embodiments, the user can touch or tap the first control field 202 or the second control field 204, such as a long touch or a double tap, to change the element displayed in the input widget 200, wherein the label bar 206 is adjusted to display a different element label and the value bar 208 is adjusted to display a corresponding value of the new element label.

In an exemplary embodiment, and if the processor 402 and/or the display controller 420 determines that the finger contact was substantially within the value bar 208, the processor 402 and/or the display controller 420 enables the user to enter a new value manually. For example, in some embodiments, when the processor 402 and/or the display controller 420 detects a finger contact substantially within the value bar 208, the processor 402 and/or the display controller 520 causes the multi-touch surface 418 to display a virtual keyboard 212. The processor 402 and/or the display controller 420 then receives a desired value from the user via the virtual keyboard 212 and adjusts the value bar 208 to display the desired value. The virtual keyboard 212 input may be detected and/or recorded using any suitable software and/or hardware technique that is known to one of skill in the art.

In an exemplary embodiment, and if the processor 402 and/or the display controller 420 determines that the finger contact was substantially within a control field, the processor 402 and/or the display controller 420 adjusts the value bar 208 based on the chosen control field. For example, a user can touch or tap the first control field 202 to decrease the value in the value bar 208. Similarly, the user can touch or tap the second control field 204 to increase the value in the value bar 208. In some embodiments, the user touches or taps the first control field 202 multiple times, such as four times, to minimize the value in the value bar 208. Similarly, in some embodiments, the user touches or taps the second control field 204 multiple times, such as four times, to maximize the value in the value bar 208. In some embodiments, the user may use gestures to minimize and/or maximize the value in the value bar 208. For example, the user may position a finger substantially over the first control field 202 and swipe down along the multi-touch surface 418 in order to minimize the value. Similarly, the user may position a finger substantially over the second control field 204 and swipe up along the multi-touch surface 418 in order to maximize the value.

FIG. 8 is a schematic block diagram of an exemplary computer system 500 for use in receiving complex data via touch input using a multi-touch surface and for use in performing the processes described above and/or additional processes that may be related to those described above. In an exemplary embodiment, a memory area 502 includes one or more storage devices 504 for use in storing data, such as complex data that is entered into a computer device as described herein, or any suitable information or data. In some embodiments, the memory area 502 is coupled to a server 506, which is in turn coupled to one or more computer systems 508, which may be an administration system, and one or more user or computer devices 510, such as a touch-input enabled computer device, via a network 512. The storage devices 504 may be embodied as one or more databases, may be located at a single or at multiple geographical sites, or may be integrated with the server 506. Moreover, the server 506 the administration system 508 may be located at a single or at multiple graphical sites. In single-site embodiments, the server 506 and the administration system 508 may be integrated into a single device.

As can be appreciated, the network 512 can be a public network, such as the Internet, or a private network such as an LAN or WAN network, or any combination thereof and can also include PSTN or ISDN sub-networks. The network 512 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 512 is merely exemplary and in no way limits the scope of the present advancements.

As one of ordinary skill in the art would recognize, the server 506, the administration system 508, and the computer devices 510 can be any suitable computer device such as the one described above with reference to FIG. 7, or any other computing system that is known. Moreover, it should be understood that the server 506 is configured to perform the processes described above and/or any additional processes that may be related to those described above.

The server 506 stores the non-transitory, computer-readable instructions to execute the processes described above, and provides these instructions via the network 512 to the administration system 508 and/or the computer devices 510. Moreover, the server 506 can also provide data from the memory area 502 as needed to the administration system 508 and/or the computer devices 510. As such, FIG. 8 includes implementations of the computer system 500 via cloud computing, distributed computing, and the like.

During operation, the computer device 510 displays an input widget, such as input widget 200, having at least one control field and at least one element bar. The position of the input widget 200 will generally depend on the context in which the input widget is used. As described above, the input widget 200 includes a first control field 202, a second control field 204, a label bar 206, and a value bar 208. Each control field 202 and 204 and bar 206 and 208 is touch input enabled. The computer device 510 detects a finger contact along the multi-touch surface 418 and substantially within one of the control field and the element bar, and transmits, for example, the position of the finger contact to the server 506 via the network 512. The computer device 510 may detect the finger contact using any suitable software and/or hardware technique that is known to one of skill in the art. For example, the computer device 510 and/or the server 506 may determine approximate coordinates of the detected finger contact along the multi-touch surface 418 and compare the coordinates to known coordinates of the control field or element bar. If the computer device 510 and/or the server 506 determines that the finger contact was substantially within the element bar 206, the computer device 510, in response to instructions from the server 506, sets the label bar 206 to display a different element label and adjusts the value bar 208 to display a corresponding value of the new element label. In some embodiments, user can touch or tap the element bar 206 to lock and/or unlock the input widget 200. For example, in some embodiments, when the computer device 510 detects a finger contact substantially within the label bar 206, a lock flag for the input widget 200 as a whole, or the value bar 208 specifically, is toggled. For example, if the value bar 208 is locked, the computer device 510 unlocks the value bar 208 in response to detecting the finger contact. In some embodiments, the user can touch or tap the first control field 202 or the second control field 204, such as a long touch or a double tap, to change the element displayed in the input widget 200, wherein the label bar 206 is adjusted to display a different element label and the value bar 208 is adjusted to display a corresponding value of the new element label.

In an exemplary embodiment, and if the computer device 510 and/or the server 506 determines that the finger contact was substantially within the value bar 208, the computer device 510 enables the user to enter a new value manually. For example, in some embodiments, when the computer device 510 and/or the server 506 detects a finger contact substantially within the value bar 208, computer device 510 displays a virtual keyboard 212 via the multi-touch surface 418. The computer device 510 then receives a desired value from the user via the virtual keyboard 212 and adjusts the value bar 208 to display the desired value, in response to instruction from the server 506 in some embodiments. The virtual keyboard 212 input may be detected and/or recorded using any suitable software and/or hardware technique that is known to one of skill in the art.

In an exemplary embodiment, and if the computer device 510 and/or the server 506 determines that the finger contact was substantially within a control field, the computer device 510 adjusts the value bar 208 based on the chosen control field. For example, a user can touch or tap the first control field 202 to decrease the value in the value bar 208. Similarly, the user can touch or tap the second control field 204 to increase the value in the value bar 208. In some embodiments, the user touches or taps the first control field 202 multiple times, such as four times, to minimize the value in the value bar 208. Similarly, in some embodiments, the user touches or taps the second control field 204 multiple times, such as four times, to maximize the value in the value bar 208. In some embodiments, the user may use gestures to minimize and/or maximize the value in the value bar 208. For example, the user may position a finger substantially over the first control field 202 and swipe down along the multi-touch surface 418 in order to minimize the value. Similarly, the user may position a finger substantially over the second control field 204 and swipe up along the multi-touch surface 418 in order to maximize the value.

Exemplary embodiments of systems, methods, and apparatus for use in receiving complex data via touch input using a multi-touch surface are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer device or user device, such as those described herein, includes at least one processor or processing unit and a system memory. The computer device or user device includes at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary touch-enabled computer system environment, embodiments of the invention are operational with numerous other general purpose or special purpose touch-enabled computer system environments or configurations. The touch-enabled computer system environment is not intended to suggest any limitation as to the scope of use or functionality of any aspect of the invention. Moreover, the touch-enabled computer system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for facilitating a touch input via a finger of a user on a multi-touch display, the computer-implemented method comprising:
   a processor and associated memory operatively coupled to the multi-touch display for displaying an input widget for enabling a user access to a plurality of element labels each having an adjustable corresponding value, the input widget including:
   a first control field associated with an element bar and responsive to touch input from the finger of the user along a surface of the multi-touch display,
   a second control field associated with the element bar and responsive to touch input from the finger of the user along a surface of the multi-touch display, and the element bar, located between the first control field and the second control field, the element bar responsive to touch input from the finger of the user along a surface of the multi-touch display, wherein the element bar further includes a label bar and a value bar, each responsive to touch input, displaying within the label bar, a currently selected one of the plurality of element labels, such that only the currently selected one of the plurality of element labels is displayed within the label bar;

displaying within the value bar, an element value corresponding to the currently selected one of the plurality of element labels, selecting the label bar for input by detecting touch input within the label bar;

detecting, after selecting the label bar for input, touch input within the first control field or the second control field, and in response to the touch input only within the first control field or second control field, adjusting the label bar to select and display a different one of the plurality of element labels and updating the value bar to display the element value corresponding to the selected different one of the plurality of element labels;

detecting a subsequent touch input within the label bar, thereby deselecting the label bar for input; and detecting, after deselecting the label bar for input, one or more touch inputs within the first control field or the second control field, and in response, adjusting the value bar to select and display a new value for the element value assigned to the selected different one of the plurality of element labels.

2. The computer-implemented method in accordance with claim 1, wherein the touch input within the first control field or the second control field being responsive to a long touch or double touch, wherein (i) the touch input within the first control field or the second control field adjusts the value bar and (ii) the long touch or the double touch within the first control field or the second control field adjusts the label bar; and in response, adjusting the label bar to select and display the different one of the plurality of element labels, and updating the value bar to display the value corresponding to the selected different one of the plurality of element labels.

3. The computer-implemented method in accordance with claim 1, wherein adjusting of the value bar comprises:

decreasing the value displayed in the value bar when the one or more touch inputs are detected within the first control field; and increasing the value displayed in the value bar when the one or more touch inputs are detected within the second control field.

4. The computer-implemented method in accordance with claim 1, comprising:

detecting touch input within the value bar and subsequently display a plurality of touch keys on the multi-touch display;

receiving, via the plurality of touch keys, a new value; and adjusting the value bar to select and display the received new value.

5. The computer-implemented method in accordance with claim 1, wherein the adjusting of the value bar comprises one of: maximizing the element value of the value bar and minimizing the element value of the value bar.

6. The computer-implemented method in accordance with claim 1, wherein the processor stores the adjusted new value for the element value assigned to the selected different one of the plurality of element labels.

7. The computer-implemented method in accordance with claim 1, wherein the contents of the element bar are adjustable when unlocked and not adjustable when locked.

8. The computer-implemented method in accordance with claim 1, wherein: the plurality of touch keys comprise a virtual keyboard that is invoked and rendered in response to detecting the touch input within the value bar.

9. The computer-implemented method in accordance with claim 1, wherein the value bar is adjusted based upon detecting one or more touch inputs within the first control field or the second control field as displayed, and the first control field and the second control field are separate from the value bar.

10. The computer-implemented method in accordance with claim 1, wherein an amount of shading is displayed in the value bar in response to detecting the one or more touch inputs within the first control field or the second control field for selecting the new value.

11. A computer device comprising:

a multi-touch display configured to receive touch input from a user and display information based on the touch input; and a processor and associated memory operatively coupled to the multi-touch display for displaying an input widget on a surface of the multi-touch display to enable a user access to a plurality of element labels each having an adjustable corresponding value, the input widget including:

a first control field associated with an element bar and responsive to touch input from the finger of the user along a surface of the multi-touch display, a second control field associated with the element bar and responsive to touch input from the finger of the user along a surface of the multi-touch display, and the element bar, located between the first control field and the second control field, the element bar responsive to touch input from the finger of the user along a surface of the multi-touch display, wherein the element bar further includes a label bar and a value bar, each being responsive to touch input;

display within the label bar, a currently selected one of the plurality of element labels, such that only the currently selected one of the plurality of element labels is displayed within the label bar, and display within the value bar, a value corresponding to the currently selected one of the plurality of element labels, select the label bar for input by detecting touch input within the label bar;

detect, after selection of the label bar, touch input within the first control field or the second control field, and in response to the touch input only within the first control field or second control field, adjust the label bar to select and display a different one of the plurality of element labels and updating the value bar to display a value corresponding to the selected different one of the plurality of element labels;

detect a subsequent touch input within the label bar, thereby deselecting the label bar for input; and detect, after deselecting the label bar for input, one or more touch inputs within the first control field or the second control field, and in response, adjust the value bar to select and display a new value for the element value assigned to the selected different one of the plurality of element labels.

12. The computer device in accordance with claim 11, wherein the touch input within the first control field or the second control field is responsive to a long touch or double touch, wherein (i) the touch input within the first control field or the second control field adjusts the value bar and (ii) the long touch or the double touch within the first control field or the second control field adjusts the label bar; and—in response, adjust the label bar to select and display a different one of the plurality of element labels, and updating the value bar to display an updated value for the element value corresponding to the selected different one of the plurality of element labels.

13. The computer device in accordance with claim 11, wherein the processor is further configured to adjust the value bar by:
decreasing the value when the one or more touch inputs are detected within the first control field and displaying the decreased value according to the one or more touch inputs; and
increasing the value when the one or more touch inputs are detected within the second control field and displaying the increased value.

14. The computer device in accordance with claim 11, wherein the processor is further configured to store the adjusted new value for the element value assigned to the selected different one of the plurality of element labels.

15. The computer device in accordance with claim 11, wherein the processor is further configured to:
detect touch input within the value bar and subsequently display a plurality of touch keys on the multi-touch display;
receive, via the plurality of touch keys as entered by the user, the new value; and
adjust the value bar to select and display the received new value.

16. The computer device in accordance with claim 11, wherein the processor is further configured to maximize contents of the value bar and minimize contents of the value bar, in response to detecting touch input within the first control field or the second control.

17. The computer device in accordance with claim 11, wherein the contents of the element bar are adjustable when unlocked and not adjustable when locked.

18. A computer system enabling touch input via a surface of a multi-touch display, the computer system comprising:
a processor and associated memory operatively coupled to the multi-touch display and configured to receive touch input from a user and display information based on the touch input, the processor configured to:
display an input widget on the multi-touch display for enabling a user access to a plurality of element labels each having an adjustable corresponding value,
the input widget including:
a first control field associated with an element bar and responsive to touch input from the finger of the user along a surface of the multi-touch display,
a second control field associated with the element bar and responsive to touch input from the finger of the user along a surface of the multi-touch display, and
the element bar, located between the first control field and the second control field, the element bar responsive to touch input from the finger of the user along a surface of the multi-touch display,
wherein the element bar further includes a label bar and a value bar, each responsive to touch input,
display within the label bar, a currently selected one of the plurality of element labels, such that only the currently selected one of the plurality of element labels is displayed within the label bar, and
display within the value bar, an element value corresponding to the currently selected one of the plurality of element labels,
select the label bar for input by detecting touch input within the label bar;
detect, after selecting the label bar for input, touch input within the first control field or the second control field, and
in response to the touch input only within the first control field or second control field, adjust the label bar to select and display a different one of the plurality of element labels and
update the value displayed in the value bar to display the value corresponding to the selected different one of the plurality of element labels;
detect a subsequent touch input within the label bar, thereby deselecting the label bar for input; and
detect, after deselecting the label bar for input, one or more touch inputs within the first control field or the second control field, and
in response, adjust the value bar to select and display a new value for the element value assigned to the selected different one of the plurality of element labels.

19. The computer system in accordance with claim 18, wherein the processor is further configured to adjust the value bar by:
decreasing the new value when the one or more touch inputs are detected within the first control field and displaying the decreased value according to the one or more touch inputs; and
increasing the new value when the one or more touch inputs are detected within the second control field and displaying the increased value.

20. The computer system in accordance with claim 18, wherein the processor is further configured to: maximize the new value and minimize the new value in response to detecting a long touch within the first control field or the second control field.

21. The computer system in accordance with claim 18, wherein the processor is further configured to:
detect a touch input within the value bar;
display a plurality of touch keys on the multi-touch display;
receive, via the plurality of touch keys, a new value; and
adjust the value bar to select and display the received new value.

22. The computer system in accordance with claim 18, wherein the contents of the element bar are adjustable when unlocked and not adjustable when locked.

23. The computer system in accordance with claim 18, wherein the multi-touch display comprising a plurality of input widgets, each input widget including: (i) the control field and (ii) the element bar associated with the label bar and the value bar.

24. The computer system in accordance with claim 18, wherein the touch input within the first control field or the second control field being a long touch or double touch, wherein (i) the touch input within the first control field or the second control field adjusts the value bar and (ii) the long touch or the double touch within the first control field or the second control field adjusts the label bar; and in response adjust the label bar to select and display a different one of the plurality of element labels, and updating the value bar to display an updated value for the element value corresponding to the selected different one of the plurality of element labels.

* * * * *